United States Patent [19]
Pugh

[11] 3,942,193
[45] Mar. 9, 1976

[54] DENTAL GLOVE

[75] Inventor: Bradley L. Pugh, Dothan, Ala.

[73] Assignee: Akwell Industries, Inc., Dothan, Ala.

[22] Filed: Mar. 27, 1975

[21] Appl. No.: 562,430

[52] U.S. Cl. .................................................. 2/167
[51] Int. Cl.² ......................................... A41D 19/00
[58] Field of Search ............... 2/159, 167, 168, 158; 427/180, 181, 207, 230, 402, 430

[56] References Cited
UNITED STATES PATENTS

| | | | |
|---|---|---|---|
| 2,621,333 | 12/1952 | Thomas et al. | 2/168 |
| 3,059,241 | 10/1962 | O'Brien et al. | 2/167 |
| 3,329,548 | 7/1967 | Blatz | 2/167 X |
| 3,728,739 | 4/1973 | Semp | 2/168 |

*Primary Examiner*—G. V. Larkin
*Attorney, Agent, or Firm*—McNenny, Farrington, Pearne & Gordon

[57] ABSTRACT

A thin-walled latex dental glove and a method of manufacturing the dental glove are disclosed. The method includes providing a mold for the dental glove, covering at least a portion of the mold with liquid uncured latex material, at least partially curing the latex material to form a glove body, and removing the glove body from the mold. The glove body is then covered with a liquid slurry containing a dusting powder and an adhesive agent and a flavor agent to wet both the interior and the exterior of the glove body with the slurry. The wetted glove body is then tumble dried at an elevated temperature to simultaneously further cure the latex and dry the water from the slurry. The dried slurry forms a substantially uniform coating substantially fully covering both the interior and exterior of the glove body. On the interior of the glove body the coating acts as a lubricant to facilitate inserting a hand into the dental glove, and on the exterior of the glove body the same coating acts as a flavoring to provide a pleasant taste in the mouth of a dental patient.

4 Claims, 4 Drawing Figures

DENTAL GLOVE

BACKGROUND AND SUMMARY OF THE INVENTION

The use of disposable gloves by dentists (including all persons whose profession is the care of teeth, such as doctors of dental surgery, dental hygienists, and dental assistants) is desirable both from the standpoint of the dentist and from the standpoint of the patient. For the patient, the use of gloves which are discarded after each use by a dentist insures against salivary and hematological transmission of infection or disease from a prior patient by way of the dentist's hands. For the dentist, the use of gloves avoids the danger of transmission of infection or disease from a patient to the dentist himself such as through a tiny cut or abrasion on the skin of the dentist's hands.

The present invention encourages the use of dental gloves by providing a dental glove which is pleasant tasting to the patient and by providing an extremely inexpensive yet highly reliable and effective method of manufacturing the dental glove. According to the principles of the invention, a mold for the dental glove is covered with a liquid uncured latex material, and the latex material is at least partially cured to form a glove body. The glove body is removed from the mold and is covered with a liquid slurry containing a dusting powder and an adhesive agent and a flavor agent or ingredient. This wets both the inside and the outside of the glove body with the slurry. The wetted glove body is then tumble dried at an elevated temperature to simultaneously further cure the latex and dry the water from the slurry to produce the finished dental glove.

The dental glove which is manufactured by this method is substantially fully covered on both the interior and exterior surfaces of the glove body with a single coating of substantially uniform composition and thickness. On the interior surface of the dental glove, the dusting powder of the coating facilitates inserting a dentist's hand into the dental glove, and the flavor agent of the coating does not adversely affect the lubricity of the dusting powder. On the exterior surface of the dental glove, the flavor agent of the coating provides a pleasant taste in the mouth of a dental patient, and the dusting powder does not adversely affect the taste of the flavor agent. In this manner, the single coating provides one function on the interior surface of the dental glove and provides a completely different and unrelated second function on the exterior surface of the dental glove.

Prior art surgical gloves are disclosed in U.S. Pat. No. 2,621,333 and 3,728,739.

INCORPORATION OF RELATED PATENT

U.S. Pat. No. 3,541,609 to Lawrence Povlacs and Richardson W. Howe is hereby incorporated by reference in this application as though fully set out herein.

BRIEF DESCRIPTION OF THE DRAWINGS

A preferred embodiment of the invention is illustrated in the drawings accompanying this application, wherein.

DETAILED DESCRIPTION OF THE DRAWINGS

Figure 4:
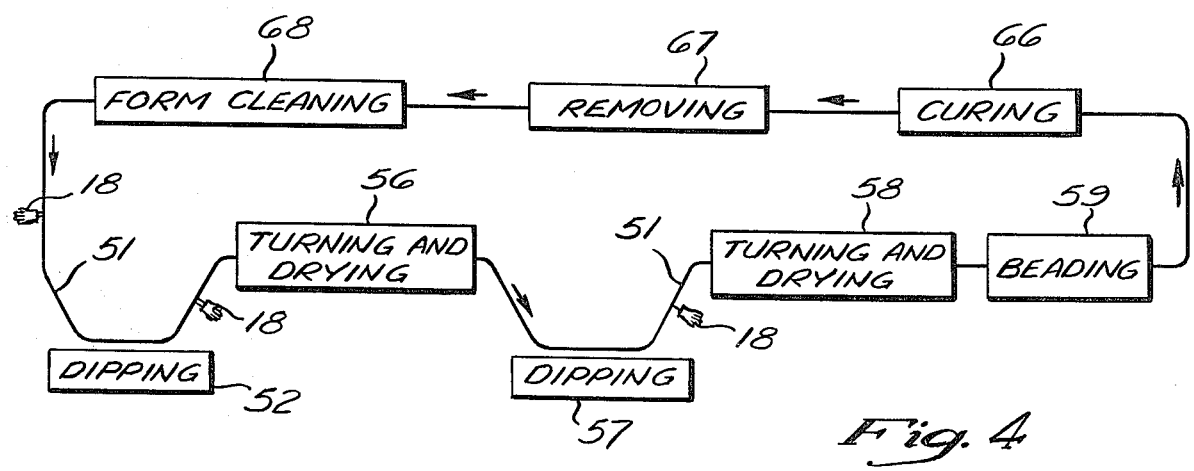
FIG. 4 is a schematic illustration of another portion of the method for manufacturing dental gloves in accordance with this invention.

Referring now to the drawings in greater detail, FIG. 4 shows the method of manufacturing a glove body which is more fully illustrated in the above referenced U.S. Pat. No. 3,541,609. The glove body is formed by first dipping a mold 18 which is carried by a conveyer 51 into a first bath 52 which is filled with liquid latex in the uncured state. The conveyer 51 causes the mold 18 to be dipped and coated as the mold 18 is carried through the first bath 52 from the left to the right as viewed in FIG. 4. The mold 18 hangs vertically downwardly during the dipping operation and may be turned about its longitudinal axis to insure that the liquid latex completely coats the mold. Although only a single mold 18 is illustrated in FIG. 4 for simplicity, the conveyer 51 carries a large number of identical closely spaced together molds for maximum efficiency.

The mold 18 is then carried through a turning and drying station 56 in which the coating from the bath 52 is dried while the mold 18 is rotated about its longitudinal axis and tipped with respect to the vertical to cause the coating to flow and evenly distribute itself along the mold 18. The particular path for rotating and tipping to produce even distribution of the coating varies somewhat with the coating material, but those skilled in the art will find little difficulty in establishing proper coating uniformity by adjusting the movement of the mold 18 to fit the requirements of the particular fluid used for the coating. During the movement through the turning and drying station 56, warm air may be blown on the coating so that it is partially dried to a substantially non-fluid condition.

After leaving the first bath 52 and the first drying station 56, the conveyer 51 is arranged to dip the mold 18 in a second bath 57 in a manner similar to the dipping at the first bath 52. This provides a second coating on the mold 18. From the second bath 57, the mold 18 is carried through a second turning and drying station 58 where the mold 18 is again turned and tipped to produce the uniform distributing of the coating material and to dry the coating until it is substantially non-fluid. The drying in the two stations 56 and 58 is not intended to provide complete curing of the coating, since further operations are required before curing is desired and since the two coatings should be such that they form a single homogeneous glove wall.

After leaving the second turning and drying station 58, the molds 18 are carried to a beading station 59. At the beading station 59, the coating adjacent the open end of the glove body is engaged by a rotating brush which rolls a bead at the open end of the glove body. This bead strengthens the glove body and improves its resistance to tearing when the glove is put on or taken off the hand of the user. The bead also insures that the open edge of the glove body is not ragged or thin.

After the bead is formed at the open end of the glove body, the conveyer 51 carries the mold 18 through a curing station 66. At this station sufficient heat is applied to further cure the coating. Although the glove body is fully cured at the curing station 66 in the drawings illustrated in the above referenced patent no.

3,541,609, complete curing at the station 66 is not effected according to the principles of the present invention. Instead, the coating on the mold 18 remains only partially cured until it is further cured as discussed in detail below.

The conveyer 51 then carries the mold 18 through an automatic stripping station 67 where the glove body is stripped from the mold 18. The stripping can be accomplished by the use of water jets, air jets, brushes or any other suitable means. From the stripping station 67 the mold 18 is carried through a cleaning station 68 where the mold is cleaned and dried for a repeated cycle. Preferably, the mold 18 is provided with a smooth finish so that the glove body will have a smooth finish and will not be difficult to strip from the mold 18 at the completion of its manufacture. The glove bodies produced in this manner have a substantially uniform thickness of less than about 0.007 in. (0.0178 cm.) and preferably on the order of about 0.003 to 0.005 in. (0.0076 cm. to 0.0127 cm.). The tips of the fingers of the glove body, however, are preferably about 0.001 in. (0.0025 cm.) thicker than the remaining portions of the glove body.

Figure 3:
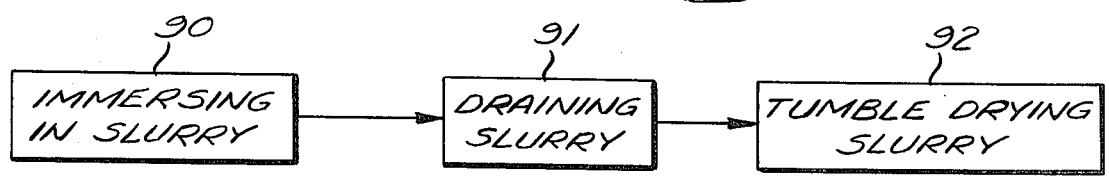
FIG. 3 is a schematic illustration of one portion of the method for manufacturing dental gloves in accordance with this invention.

After the glove body is removed from the mold 18, it is in a flat condition (that is, the glove body is not in a rolled condition in which it is rolled upon itself about the bead at the open end of the glove body). The glove body is then placed in a standard commercial laundry drier. In the preferred embodiment, 30 pounds (13.6 kg.) of glove bodies are placed in the laundry drier and 15 gallons (56.7 l.) of a liquid water suspension slurry containing a dusting powder and an adhesive agent and a flavor are added to the laundry drier. The laundry drier is then closed and tumbled for 25 minutes to completely wet both the interior and the exterior surfaces of the glove body with the slurry. This step of immersing the glove bodies in the slurry is indicated by reference numeral 90 in FIG. 3 of the drawings.

The slurry according to the principles of the invention is of the following composition, which provides a 500 gallon (1892.5 l.) batch of the slurry:

| | |
|---|---|
| Absorbable Dusting Powder (Starch) | 1500 lbs. (680.2 kg.) |
| Silicone Emulsion (Water emulsion of dimethylpolysiloxane) | 5 gal. (18.9 l.) |
| 10% Water Solution of Sodium Hexametaphosphate | 5 gal. (18.9 l.) |
| Flavor (20% water solution of essential oil of spearmint fixed on dextrin) | 120 lbs. (54.4 kg.) |
| Sodium Saccharin (2-Sulfobenzoic Acid Imide) | 4 lbs. (1.8 kg.) |
| Water | to 500 gallons (1892.5 l.) |

The silicone emulsion is used as an adhesive agent to adhere the dusting powder to the interior and exterior surfaces of the glove body. The sodium hexametaphosphate solution is used as a wetting agent to wet the dusting powder into solution. The essential oil of spearmint flavor is sprayed or fixed onto the surface of dextrin. Other dusting powders (such as talc or a mixutre of talc and starch) and other commercially available flavor agents (such as spearmint or lemon fixed on dextrin or liquid flavor agents) may be substituted in this slurry, and the exact quantities of such substitutes in the slurry may easily be determined by those skilled in the art in light of the teachings of this application.

At the completion of the 25 minute tumbling of the glove bodies and slurry, a drain at the bottom of the drier is opened and the slurry is allowed to drain out. This step is indicated by reference numeral 91 in FIG. 3 of the drawings. The glove bodies are then tumbled in the laundry drier at an elevated temperature of 200° to 260°F (93.3° to 126.7°C) for 2 hours. This simultaneously dries the water from the slurry and completes the curing of the latex. This step is indicated by reference numeral 92 in FIG. 3 of the drawings. The finished dental gloves are then removed from the laundry drier and are ready to be packaged for storage and shipment.

Figure 1:
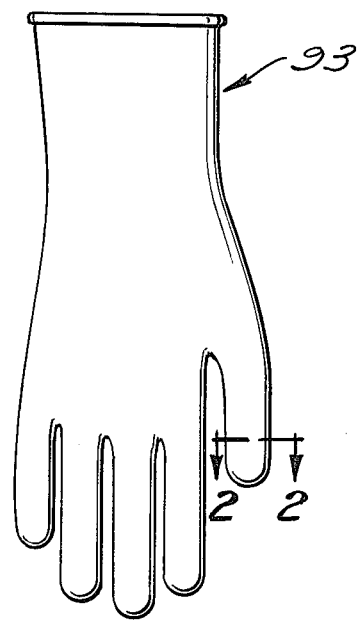
FIG. 1 is a perspective view of a dental glove according to the principles of the invention.
Figure 2:
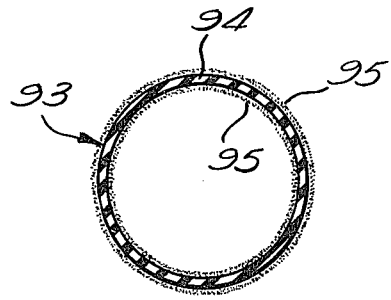
FIG. 2 is a cross-section taken along reference view line 2—2 of FIG. 1.

The dental glove according to the principles of this invention which is manufactured by this method is shown in FIGS. 1 and 2 and is identified by reference numeral 93. The dental glove 93 includes a thin-walled elastic latex glove body 94 and a single substantially uniform coating 95 which substantially fully covers both the interior and the exterior surfaces of the glove body 94. The coating 95 includes the starch dusting powder and the silicone emulsion adhesive agent and the flavor agent and saccharin. On the interior surface of the dental glove 93, the dusting powder of the coating 95 facilitates inserting a dentist's hand into the dental glove, and the flavor agent and saccharin of the coating 95 do not adversely affect the lubricity of the dusting powder or make the interior of the dental glove sticky. On the exterior surface of the dental glove 93, the flavor agent provides a pleasant taste in the mouth of a dental patient, and the dusting powder does not adversely affect the taste of the flavor agent.

What is claimed is:

1. A thin-walled elastic dental glove comprising an elastic glove body having an interior surface and an exterior surface, and a single substantially uniform coating means substantially fully covering both said interior and exterior surfaces of said glove body, said single coating means including a lubricant means and a flavor agent means, said coating means by operation of said lubricant means on said interior surface facilitating insertion of a dentist's hand into said glove body, and said coating means by operation of said flavor agent means on said exterior surface providing a pleasant taste in the mouth of a dental patient.

2. A thin-walled elastic dental glove as defined in claim 1 wherein said lubricant means is a dusting powder.

3. A thin-walled elastic dental glove as defined in claim 2 wherein said dusting powder is starch, said glove body is latex, and said coating means further includes an adhesive agent means adhering said starch to said latex.

4. A thin-walled latex dental glove comprising a latex glove body having an interior surface and an exterior surface, and a single substantially uniform coating means substantially fully covering both said interior and exterior surfaces of said glove body, said single coating means including dusting powder means and flavor agent means and adhesive agent means, said coating means by operation of said dusting powder means on said interior surface facilitating insertion of a dentist's hand into said glove body, and said coating means by operation of said flavor agent means on said exterior surface providing a pleasant taste in the mouth of a dental patient.

* * * * *